R. S. KINKEAD.
CONNECTING ROD.
APPLICATION FILED NOV. 22, 1912.

1,130,982.

Patented Mar. 9, 1915.

SECT. Y-Y

SECT. X-X.

WITNESSES
M. R. McInnis
Q. E. Sorensen

INVENTOR
ROBERT S. KINKEAD
BY Paul & Paul
ATTORNEYS

UNITED STATES PATENT OFFICE.

ROBERT S. KINKEAD, OF MINNEAPOLIS, MINNESOTA.

CONNECTING-ROD.

1,130,982. Specification of Letters Patent. Patented Mar. 9, 1915.

Application filed November 22, 1912. Serial No. 732,939.

*To all whom it may concern:*

Be it known that I, ROBERT S. KINKEAD, a citizen of the United States, resident of Minneapolis, in the county of Hennepin, State of Minnesota, have invented certain new and useful Improvements in Connecting-Rods, of which the following is a specification.

The object of my invention is to provide a connecting rod of simple, economical construction and one which will be accurate and positive in its action and adapted particularly for taking up the lost motion in a crank pin bearing due to the wear on the shaft.

Other objects of the invention will appear from the following detailed description.

The invention consists generally in various constructions and combinations, all as hereinafter described and particularly pointed out in the claims.

Figure 5:
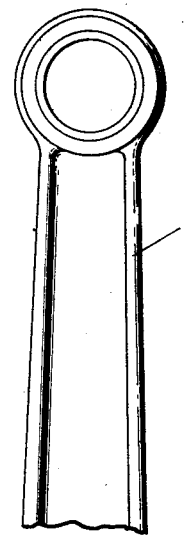
Figure 5:
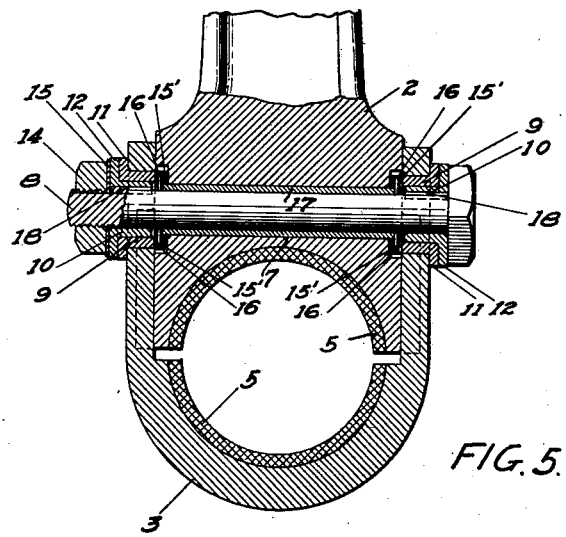
Figure 3:
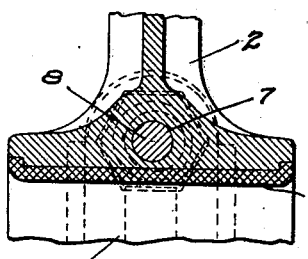
Figure 1:
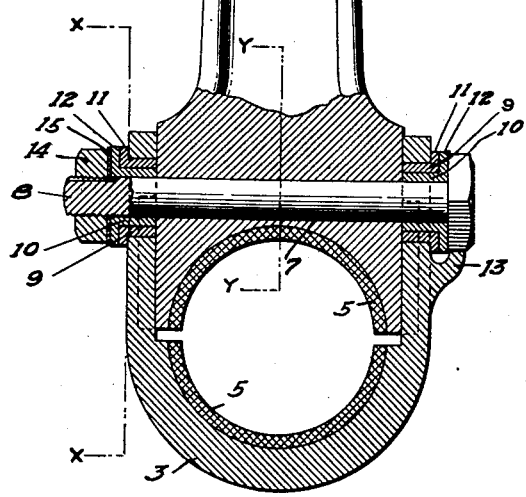
Figure 2:
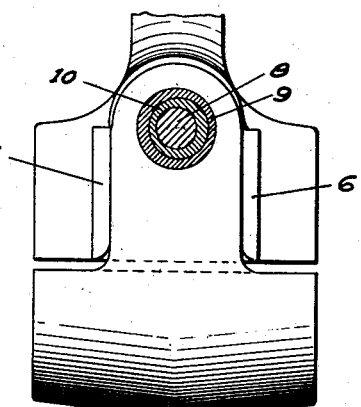
Figure 4:
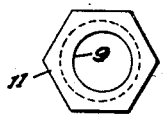

In the accompanying drawings forming part of this specification, Figure 1 is a view, partially in section, illustrating the application of my invention to a connecting rod, Fig. 2 is a sectional view on the line x—x of Fig. 1, Fig. 3 is a sectional view on the line y—y of Fig. 1, Fig. 4 is an outside end view of one of the eccentric sleeves, Fig. 5 is a detail sectional view illustrating a slightly modified construction.

In the drawing, 2 represents a connecting rod.

3 is a strap, U-shaped, substantially, in form, and having a semi-circular bearing 5 in the end of the rod. The ends of the strap are adapted to slide between guides 6 arranged in pairs upon opposite sides of the connecting rod. Between these guides the rod is provided with a transverse hole or socket 7, preferably circular in cross section, to receive a bolt 8 which also passes through holes provided in the ends of the strap. The holes in the strap are considerably larger than the diameter of the bolt and are adapted to receive eccentric sleeves or bushings arranged in pairs in each end of the strap, the eccentrics of each pair having the same degree of eccentricity. The outer end of the sleeves 9 bear on the walls of the strap openings and the inner sleeves 10 are inserted between the outer sleeves and the bolt. Both sleeves have flanged outer ends 11 and 12 which may be provided with roughened bearing surfaces for the purpose of locking them together.

When the device is assembled, the eccentrics are arranged so that the distance from the center of each hole through the strap ends to the outer surface of the outer eccentric along a line drawn at right angles to the direction of movement of the strap ends will be equal, and this distance will always remain constant and when the eccentric sleeves are rotated, one of a pair in one direction and the other of the same pair in the opposite direction, the eccentricity of one sleeve will neutralize the tendency of the other sleeve as regards lateral movement of the strap ends and will produce a movement of said ends lengthwise of the connecting rod and between its guides. I prefer to provide a lug 13 on one end of the strap to engage the head of the bolt and prevent it from turning during the operation of tightening the lock nut 14. The bolt is preferably provided with a longitudinal slot to receive a lug provided on the washer 15. This, however, is an ordinary construction and need not be illustrated in detail.

To take up the lost motion in the bearing due to wear, I first loosen the lock nut 14 and then by means of a suitable tool rotate the eccentric sleeves of each pair simultaneously and in opposite directions until the desired adjustment is obtained, the ends of the strap moving on the bolt between the guides. It will be noted that the bolt has a long bearing surface in the rod between the eccentric sleeves and as this surface is curved to fit the bolt, there is no danger of the strap becoming loose, due to the wear of the bolt in its bearing.

In Fig. 5 I have shown a modification which consists in providing slots 15' in the inner ends of the outer sleeves to receive pins 16 provided on the outer ends of a sleeve 17 which incloses the middle portion of the bolt and extends through the hole 7 in the rod. This sleeve insures the simultaneous and equal rotary movement of the outer sleeves and also forms a removable bearing for the bolt. I also prefer to provide key-seats 18 in the bolt 8 to enable the operator to rotate the inner sleeves simultaneously by turning the bolt in one direction while the outer eccentric sleeves are rotated in the opposite direction.

I claim as my invention:—

1. The combination, with a connecting rod having a bearing at one end and a transverse hole near said bearing and guides on its outer faces on each side of said hole, of a U-shaped strap having a central bearing and end portions adapted to move between said guides and provided with holes to register with the hole in said rod, said strap holes being of greater diameter than the hole in said rod, a bolt fitting snugly within the hole in said rod and projecting through the holes in said strap and provided with a head at one end and a lock nut at its opposite end, and a pair of eccentric sleeves interposed between each of the ends of said bolt and the walls of each of said strap openings and capable of rotation in said openings, the inner sleeve of each pair being rotatable in the opposite direction from the outer sleeve of the same pair to move said strap lengthwise between said guides, both sleeves of a pair being of the same degree of eccentricity.

2. The combination, with a connecting rod having a bearing at one end and a transverse hole near said bearing, of a substantially U-shaped strap having a bearing opposite the bearing on said rod, and ends adapted to bear on the outer faces of said rod and having holes adapted to register with the hole in said rod, a bolt fitting within the hole in said rod and extending through the holes in said strap and having means for locking it in said rod, and eccentric sleeves arranged one within the other at each end of said bolt and between it and the walls of said strap holes, said sleeves being rotatable in opposite directions to move the ends of said strap lengthwise on said rod.

3. The combination, with a connecting rod having a transverse hole therein, of a U-shaped strap having ends adapted to bear on the opposite sides of said rod and having holes to register with the hole in said rod, a sleeve fitting within the hole in said rod, a bolt within said sleeve and projecting outwardly through the holes in said strap ends and having means for locking it on said strap, eccentric sleeves disposed one within another in said strap holes, one eccentric sleeve at each end of said bolt having means connecting it with said first named sleeve for simultaneous movement, the other eccentric sleeves having a key-way on said bolt, whereby the rotation of the corresponding sleeves at opposite ends of said bolt will be simultaneous.

4. The combination, with a connecting rod having a bearing at one end and a transverse hole near said bearing, of a substantially U-shaped strap having a bearing opposite the bearing on said rod and ends adapted to bear on the outer faces of said rod and having holes adapted to register with the hole in said rod, a bolt fitting within the hole in said rod and extending through the holes in said strap and having means for locking it in said rod, eccentrics arranged on said bolt, said eccentrics being rotatable in opposite directions for relative movement of said strap and rod.

5. The combination, with a connecting rod having a bearing at one end and a transverse hole near said bearing, of a substantially U-shaped strap having a bearing opposite the bearing on said rod and ends adapted to bear on the faces of said rod and having holes to register with the hole in said rod, a bolt fitting within the hole in said rod and extending through the holes in said strap and having means for locking it on said rod, eccentrics arranged one within the other on said bolt and rotatable in opposite directions for relative movement of said strap and rod.

In witness whereof, I have hereunto set my hand this 16th day of November, 1912.

ROBERT S. KINKEAD.

Witnesses:
GENEVIEVE E. SORENSEN,
EDWARD A. PAUL.